US006996295B2

(12) United States Patent
Tyan et al.

(10) Patent No.: US 6,996,295 B2
(45) Date of Patent: Feb. 7, 2006

(54) AUTOMATIC DOCUMENT READING SYSTEM FOR TECHNICAL DRAWINGS

(75) Inventors: Jenn-Kwei Tyan, Princeton, NJ (US); Ming Fang, Princeton Jct., NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 790 days.

(21) Appl. No.: 10/125,200

(22) Filed: Apr. 18, 2002

(65) Prior Publication Data

US 2003/0130992 A1 Jul. 10, 2003

Related U.S. Application Data

(60) Provisional application No. 60/347,265, filed on Jan. 10, 2002.

(51) Int. Cl.
*G06K 9/36* (2006.01)
*G06F 7/00* (2006.01)

(52) U.S. Cl. ............................ 382/305; 382/113; 707/3

(58) Field of Classification Search ................. 382/113, 382/155, 156, 176, 218, 305; 345/441, 470; 707/3, 204

See application file for complete search history.

(56) References Cited

U.S. PATENT DOCUMENTS 4,665,555 A * 5/1987 Alker et al. ................ 382/305
5,774,130 A * 6/1998 Horikawa et al. .......... 345/441
5,798,766 A * 8/1998 Hayashi et al. ............. 345/595
5,995,659 A * 11/1999 Chakraborty et al. ....... 382/176
6,226,767 B1 * 5/2001 Sundaram .................... 714/723
6,678,705 B1 * 1/2004 Berchtold et al. .......... 707/204
6,693,635 B1 * 2/2004 Yokomizo .................... 345/428
6,707,932 B1 * 3/2004 Chakraborty ............... 382/113

* cited by examiner

*Primary Examiner*—Kanjibhai Patel
(74) *Attorney, Agent, or Firm*—Donald B. Paschburg; F. Chau & Associates, LLP

(57) ABSTRACT

A system and method for electronic archival of paper-based technical drawings includes a system having a processor, a form learning unit in signal communication with the processor for learning the form of a model drawing image, a form localization unit in signal communication with the processor for localizing the form of an input drawing image, an optical character recognition unit in signal communication with the processor for optically recognizing identification text of the input drawing image, and a result verification unit in signal communication with the processor for verifying the results of the recognized identification text of the input drawing image; and further includes a method for providing a model drawing image, learning the form of the provided model drawing image, receiving an input drawing image, localizing the form of the input drawing image, optically recognizing identification text of the input drawing image, verifying the results of the recognized identification text of the input drawing image, and storing the input drawing image and the corresponding verified identification text into a drawing database.

22 Claims, 10 Drawing Sheets

800

900

1000

AUTOMATIC DOCUMENT READING SYSTEM FOR TECHNICAL DRAWINGS

CROSS REFERENCE TO RELATED APPLICATION

The present application claims priority to U.S. Provisional Patent Application Ser. No. 60/347,265, filed Jan. 10, 2002, which is hereby incorporated by reference.

BACKGROUND

Many paper-based technical drawings from the past are still valuable for design, manufacturing and maintenance support. Unfortunately, managing these paper-based technical drawings, which are typically kept in paper file archives, is expensive and labor-intensive.

An electronic archival system capable of accessing and managing drawings for immediate electronic retrieval and/or viewing is desireable. An obstacle to creating such a system is that the textual descriptions in the paper-based drawings must be extracted, recognized, and stored electronically. However, manual input of textual descriptions is generally unacceptable because it presents a slow and fallible process.

Several form-reading systems have been proposed or developed for the processing of generic forms. Unfortunately, the processing of technical drawings faces more difficult challenges in that technical drawings are scanned in large image format, and the document data required for processing is often quite large; noise and artifacts due to document aging degrade the quality of scanned images, and the cost for skilled human intervention is significantly high; and technical drawings have a variety of form layouts and context styles, and the information to be read varies from one drawing to another. In order to achieve desirable performance in speed and accuracy, an automated system for electronic archival of paper-based technical drawings is needed.

SUMMARY

These and other drawbacks and disadvantages of the prior art are addressed by a system and method for electronic archival of paper-based technical drawings. The system includes a processor, a form learning unit in signal communication with the processor for learning the form of a model drawing image, a form localization unit in signal communication with the processor for localizing the form of an input drawing image, an optical character recognition unit in signal communication with the processor for optically recognizing identification text of the input drawing image, and a result verification unit in signal communication with the processor for verifying the results of the recognized identification text of the input drawing image.

The corresponding method includes steps for providing a model drawing image, learning the form of the provided model drawing image, receiving an input drawing image, localizing the form of the input drawing image, optically recognizing identification text of the input drawing image, verifying the results of the recognized identification text of the input drawing image, and storing the input drawing image and the corresponding verified identification text into a drawing database.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches electronic archival of paper-based technical drawings in accordance with the following exemplary figures, in which.

DETAILED DESCRIPTION OF PREFERRED EMBODIMENTS

Figure 1:
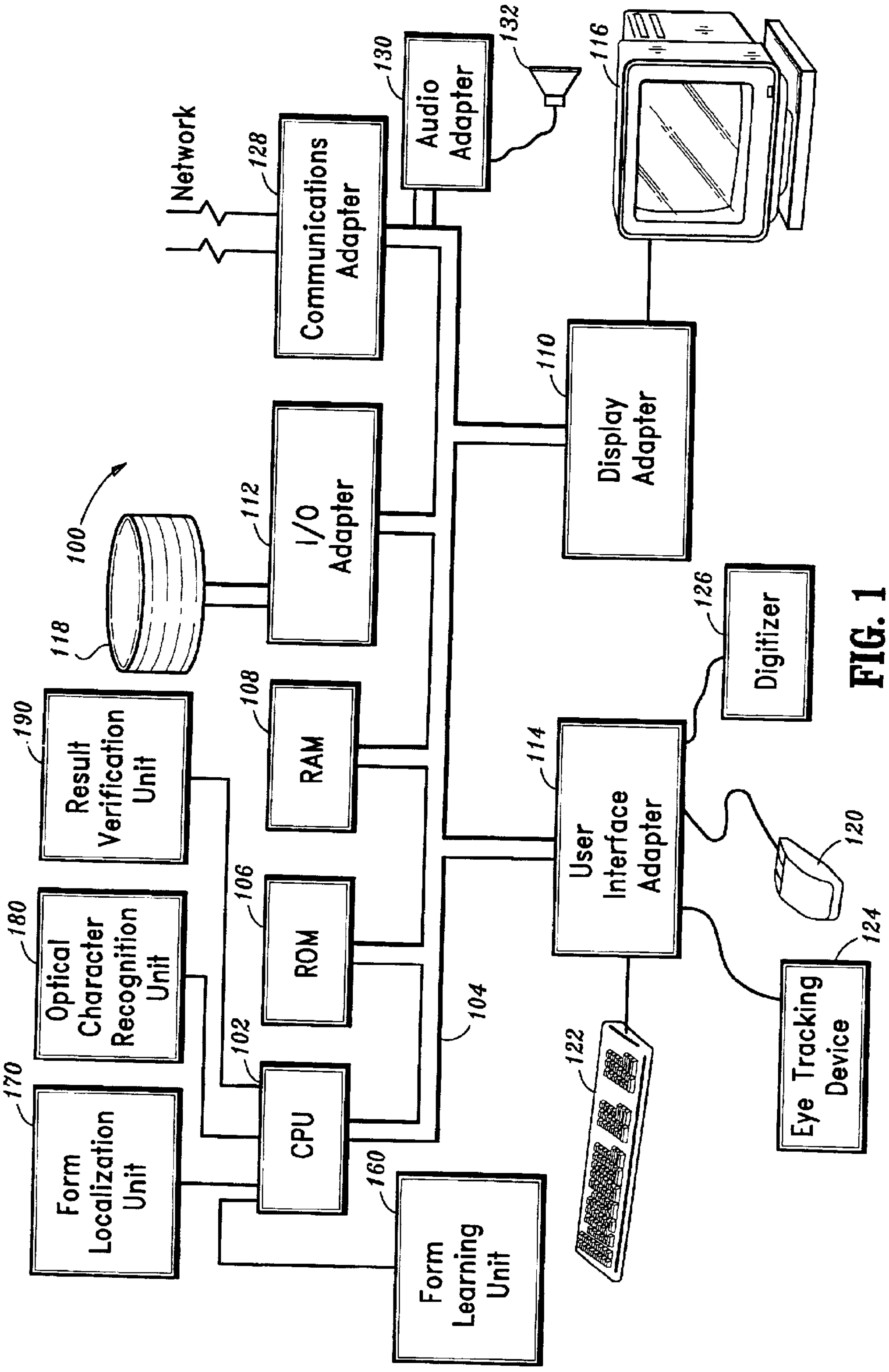
FIG. 1 shows a block diagram of a system for electronic archival of paper-based technical drawings according to an illustrative embodiment of the present disclosure.

The reading of technical drawings is a complex task for automated document processing. In the present disclosure, a system is presented for reading textual descriptions from technical drawings that provides capabilities for converting paper-based drawing documents into an electronic archival database. The system includes the four major processing elements of form learning, form localization, optical character recognition ("OCR"), and result verification. The algorithms for each element are dedicated to solving the practical problems involved with reading technical drawing documents. Among them, form localization and OCR are key processes that realize great benefits from automation. Results have proven the feasibility and efficiency of the presently disclosed approaches.

In the present disclosure, an automated reading system is especially dedicated to technical drawings. The designed system for electronic archival of paper-based technical drawings reduces the human labor involved in entering information from paper-based documents. To make a system work practically, reading of textual descriptions is facilitated by bounding with geometric or rectangular boxes located in the form area and the graphic area. These boxes contain the drawing identification number, revision history (e.g., date, author, version number) and parts interconnection; which are the most important information regions in this exemplary embodiment. Reading of annotated text outside of bounding boxes is not important because such text is typically mixed with graphics and does not reveal information that is important for building an electronic archival system.

FIG. 1 shows a block diagram of a system 100 for electronic archival of paper-based technical drawings according to an illustrative embodiment of the present disclosure. The system 100 includes at least one processor or central processing unit ("CPU") 102 in signal communication with a system bus 104. A read only memory ("ROM") 106, a random access memory ("RAM") 108, a display adapter 110, an I/O adapter 112, and a user interface adapter 114 are also in signal communication with the system bus 104.

A display unit 116 is in signal communication with the system bus 104 via the display adapter 110. A disk storage unit 118, such as, for example, a magnetic or optical disk storage unit, is in signal communication with the system bus 104 via the I/O adapter 112. A mouse 120, a keyboard 122, and an eye tracking device 124 are also in signal communication with the system bus 104 via the user interface adapter 114. The mouse 120, keyboard 122, and eye-tracking device 124 are used to aid in the verification of optically recognized characters in a technical drawing.

A form learning unit 160, a form localization unit 170, an optical character recognition ("OCR") unit 180 and a result verification unit 190 are also included in the system 100 and in signal communication with the CPU 102 and the system bus 104. While the form learning unit 160, form localization unit 170, OCR unit 180 and result verification unit 190 are illustrated as coupled to the at least one processor or CPU 102, these components are preferably embodied in computer program code stored in at least one of the memories 106, 108 and 118, wherein the computer program code is executed by the CPU 102.

The system 100 may also include a digitizer 126 in signal communication with the system bus 104 via a user interface adapter 114 for digitizing an image of a technical drawing. Alternatively, the digitizer 126 may be omitted, in which case a digital image may be input to the system 100 from a network via a communications adapter 128 in signal communication with the system bus 104, or via other suitable means as understood by those skilled in the art.

As will be recognized by those of ordinary skill in the pertinent art based on the teachings herein, alternate embodiments are possible, such as, for example, embodying some or all of the computer program code in registers located on the processor chip 102. Given the teachings of the disclosure provided herein, those of ordinary skill in the pertinent art will contemplate various alternate configurations and implementations of the form learning unit 160, form localization unit 170, OCR unit 180 and result verification unit 190, as well as the other elements of the system 100, while practicing within the scope and spirit of the present disclosure.

Figure 2:
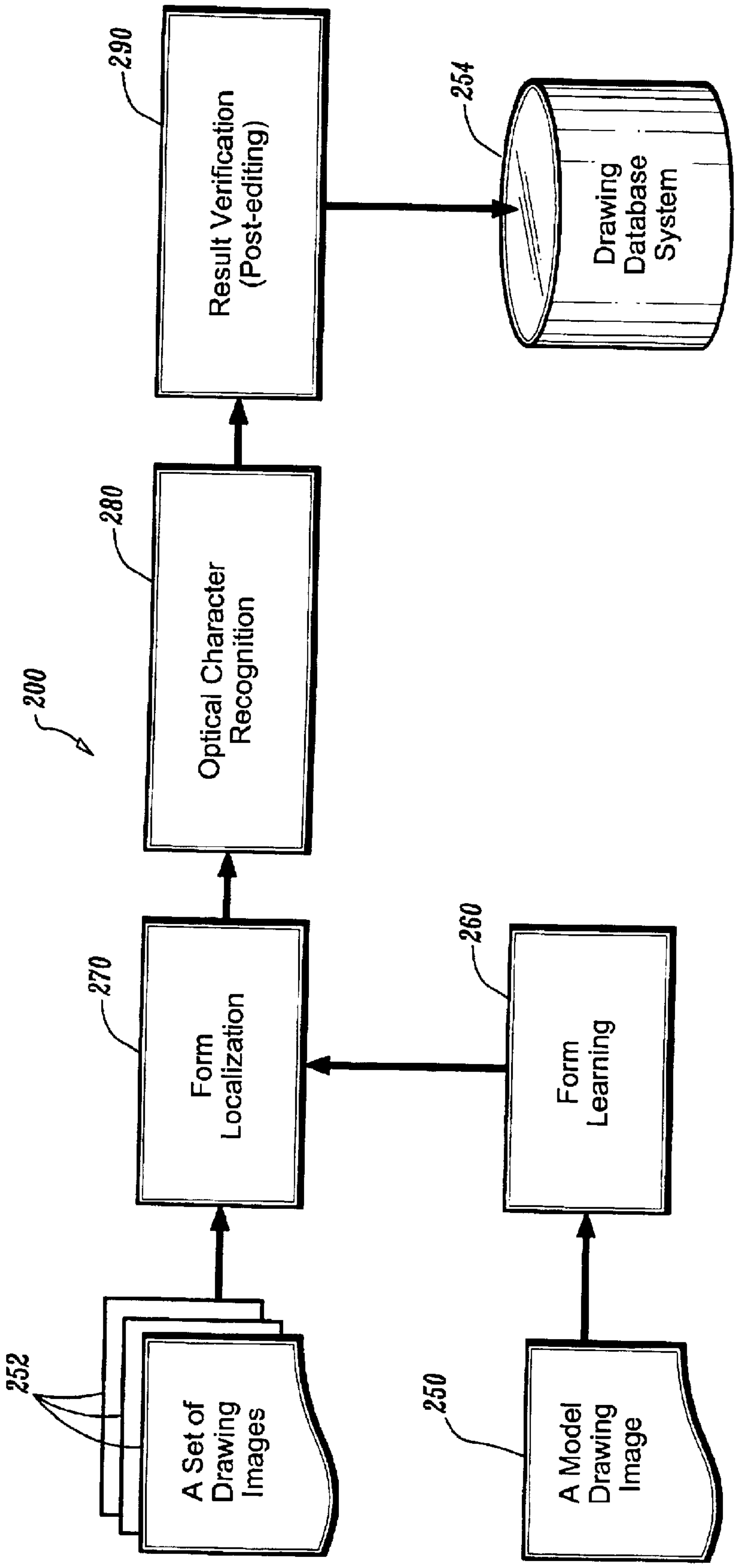
FIG. 2 shows a partial-schematic flow diagram for a method of using the system of FIG. 1.

Turning to FIG. 2, the system includes the four major processing units of form learning 260, form localization 270, optical character recognition ("OCR") 280, and result verification 290. These elements are connected in a serial fashion so that each performs dependent on previous element's input.

The system begins with form learning 260, which creates a form template to teach the system 200 how to read a form of documents. A form template includes information about the major lines of a drawing form, fields of interest ("FOI"s) indicating where the data should be extracted, and contextual knowledge about the fields of interest. An image-based training method that incorporates user interaction is developed for collecting this information from a model drawing image 250.

Scanned documents 252 may be distorted, such as, for example, by translation, rotation and/or scaling relative to the original document. Form localization 270 identifies form pose and detects all specified FOIs from an input image 252. In this portion, all input documents 252 are checked for match with a learned form template. Based on form lines, an iterative line-matching algorithm is used for efficiently registering two sets of lines. The algorithm can estimate a form pose and provide matching conditions to determine whether the input document 252 is suitable for processing. Given a form pose, the document is corrected and all FOIs recorded in the form template are converted to the corresponding locations.

In the OCR portion 280, textual descriptions in the detected FOIs are read. Due to exemplary performance requirements, a hybrid classifier combined with neural network and template-matching techniques is used for character recognition. The hybrid algorithm integrates the advantages of two techniques and allows the system to train new symbols incrementally. In addition, the reading accuracy is improved by using the hybrid classifier to provide feedback for character segmentation in dealing with touching and/or broken characters.

The next processing element is result verification and/or post-editing 290. Since OCR section 280 output may not be 100% correct, the system 200 permits the user to verify the OCR results based for selected images. An OCR post-editor based on criteria search results is used in the system 200 for rapid result verification and modification. The virtually error-free textual identification results are output and stored in correspondence with the drawing images 252 into an electronic archival database 254. In this embodiment, building a template library for form recognition is not necessary because FOIs may vary even though the drawing forms are the same. Thus, the system applies a form template at the processing cycle for form localization 270 to obtain a set of consistent FOIs. The operator is responsible for pre-classifying the drawing types and selecting a proper form template for reading. This may benefit the later step of result verification 290 in which the operator can apply consistent knowledge to check and/or manage document results. Alternate embodiments may comprise a template library for form recognition in order to automatically recognize various forms of drawings in accordance with the templates of the library.

Figure 3:
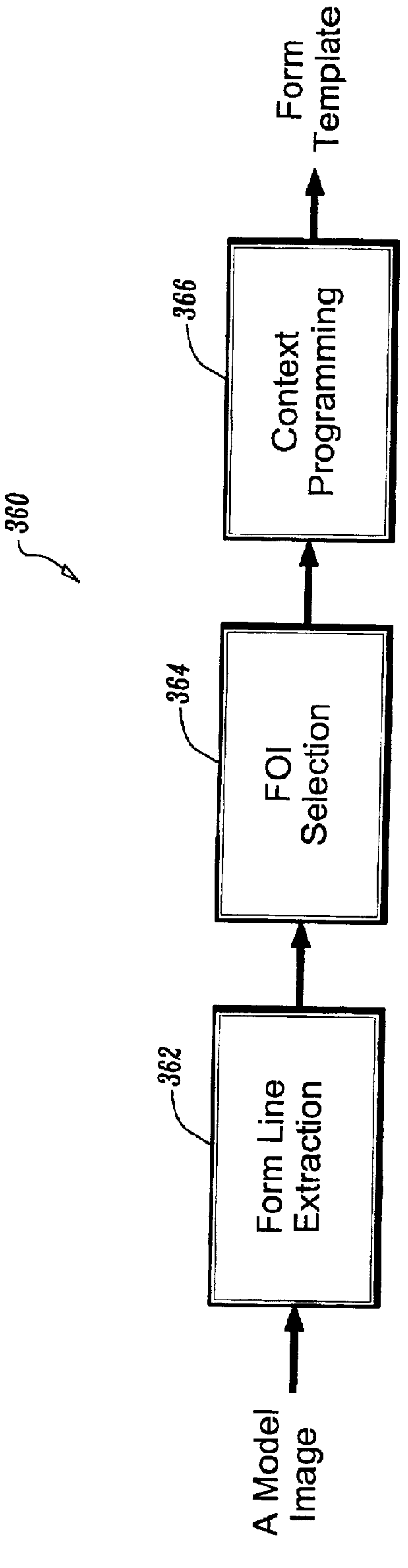
FIG. 3 shows a flow diagram for a portion of the method of FIG. 2.

Turning now to FIG. 3, an image-based training approach 360 is used to create a form template. The approach 360 includes the three processing steps of form line extraction 362, field of interest ("FOI") selection 364 and context programming 366. Each of the steps, in sequence, provides the necessary information that can be used later for reading. Given a model image 250 of FIG. 2, whether the form is empty or filled, the form lines are first extracted.

Figure 4:
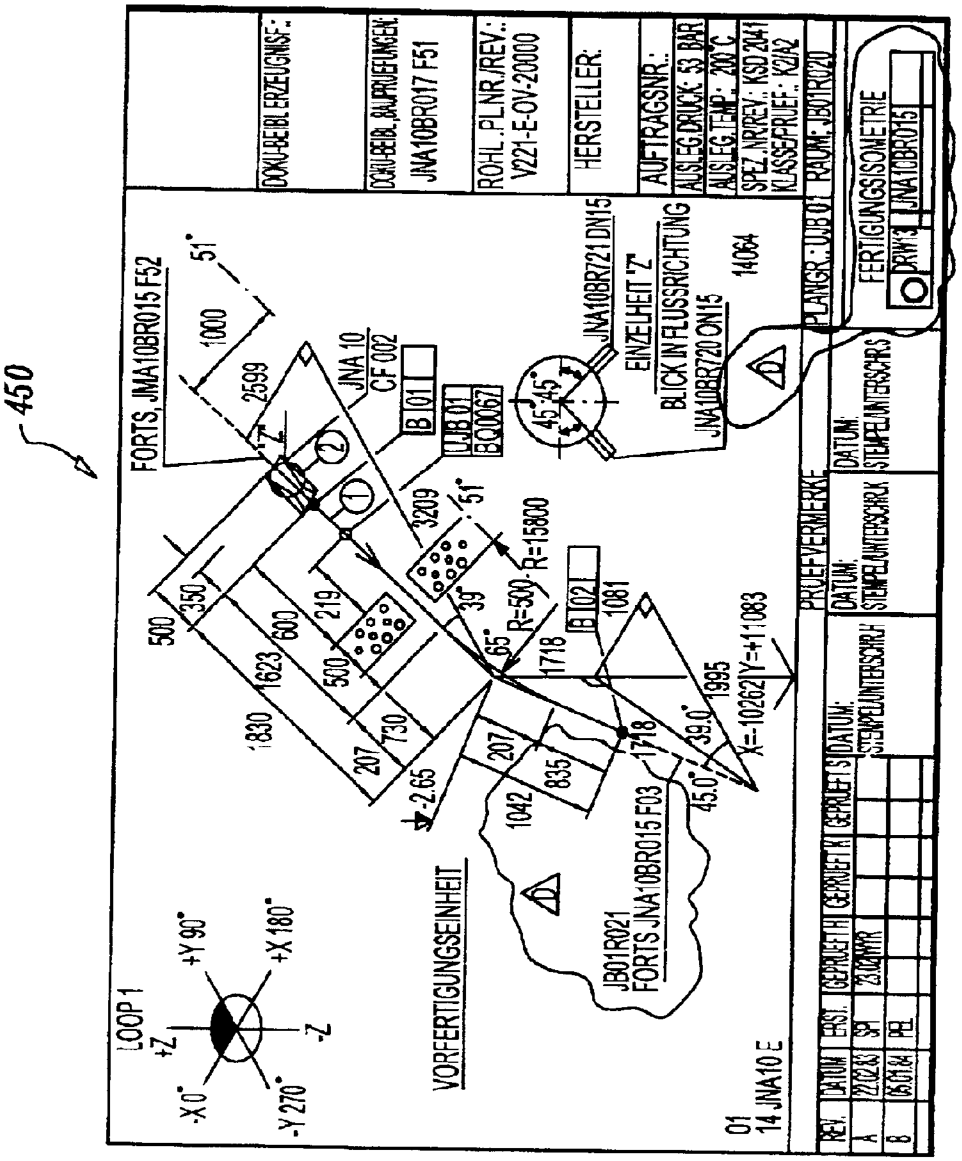
FIG. 4 shows a sample drawing document for form learning in accordance with FIG. 3.

As shown in FIG. 4, a sample drawing document for form learning, or form image, is indicated by the reference numeral 450. In the exemplary algorithm 362 of FIG. 3, only vertical and horizontal lines are considered as learning features. It is assumed that the model image 250 of FIG. 2 is well-aligned, or that any skew correction is applied beforehand. The form line extraction 362 is based on a connected-components analysis algorithm that labels long connected lines with run-length encoding. The algorithm looks for horizontal lines in the same way as for vertical lines. A rectangle block is used to model a detected line with parameters (e.g., the top-left and the bottom-right corners) being computed from the group of runs with the same label. A pre-defined threshold can be used to reject a skewed line based on an exemplary criterion of $\tan^{-1}(W/L)$, where W is the line width and L is the line length. Critical points at intersections of vertical and horizontal lines are further detected, and their positions are stored in the template as well. Normally, the borderline is assumed to be the longest connected component for all drawing documents, and the content in the graphic region is excluded from the form line extraction process.

Next, fields of interest ("FOI"s) are selected at step 364 in accordance with a user selection. A FOI is typically defined as a completely boxed region that may contain both preprinted text and filled-in text. In an exemplary embodiment system, a boxed FOI is the highest interest area for reading and FOI selection excludes those texts with no surrounding box. According to this condition, two exemplary types of FOIs can be defined for technical drawings. One is regularly located in the form area and describes drawing identification information such as, for example, author name, origination date, version number, model number and project number, etc. The other is randomly located in the graphic area and describes parts interconnection among other drawings. For a FOI selected in the form area, the position and size of a bounding box is determined by the outside critical points obtained from the form line detection. If critical points along the lines define a rectangular box, the preprinted region and the filled-in region are further analyzed in accordance with a set of pre-defined field styles.

Figure 5:
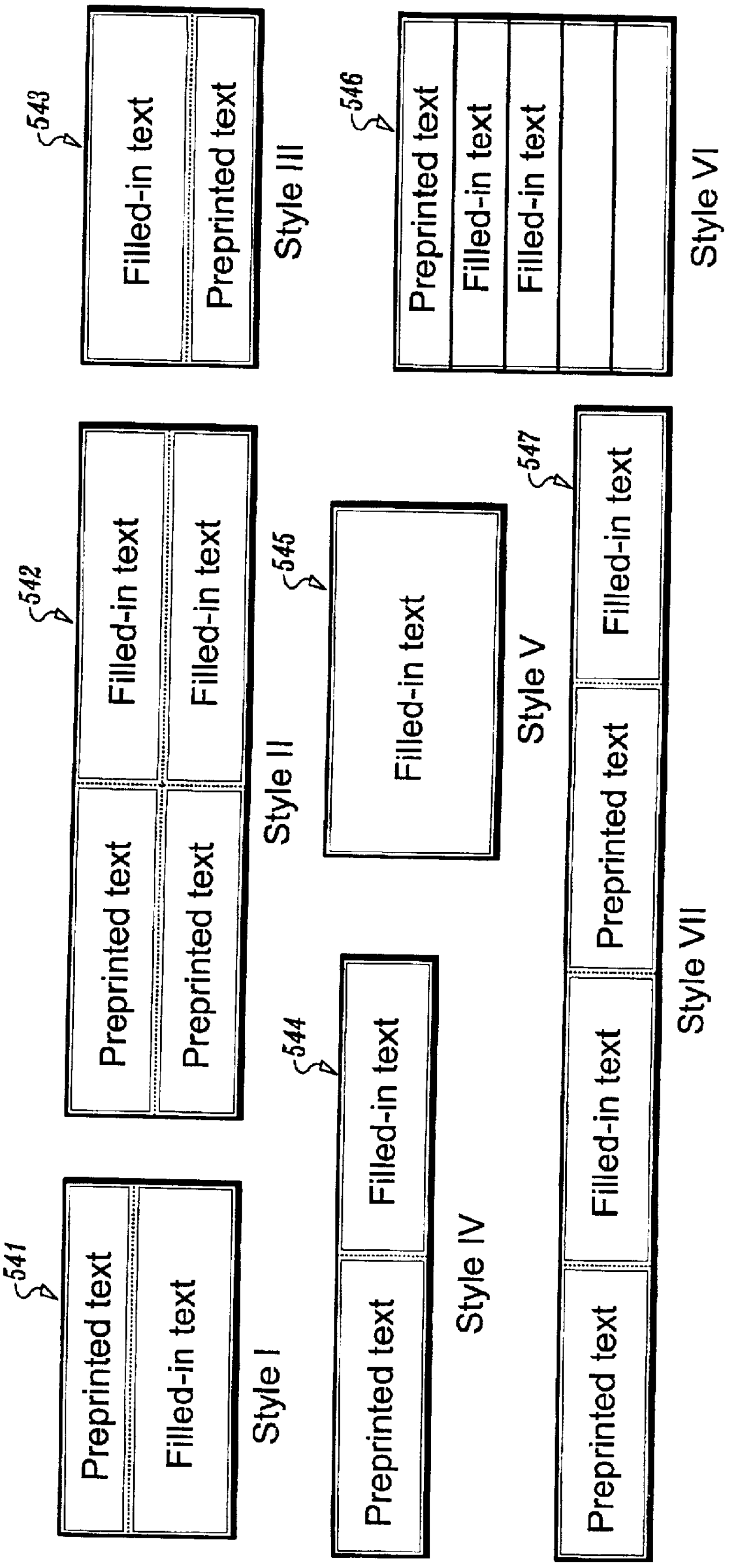
FIG. 5 shows exemplary field styles for use in the method portion of FIG. 3.

FIG. 5 shows the most frequently encountered field styles for the exemplary embodiment system. A first style 541, a second style 542, a third style 543, a fourth style 544, a fifth style 545, a sixth style 546 and a seventh style 547 may be indicated individually or in combination within a given form. To cover possible combinations of field styles, a field control tool is implemented to allow the field style be customized in any forms. However, if a FOI is located in graphic area, the position and size of a bounding box are not usually determined at this time due to their variations within individual drawings. Instead, the graphic region related to the form is specified and a tolerance factor for the FOI size is programmed. The detection algorithms for searching these two types of FOIs (i.e., form area and graphic area) will be performed differently for each type in the form localization process 270 of FIG. 2. Although the form-learning algorithm is not necessary to work on an empty form, it can be applied for a drawing image with all filled-in data, which provides for learning flexibility in cases where the empty forms for technical drawings are not provided.

Each selected field is programmed according to the available contextual information. Thus, the context may define the length of a text string and the positions of its characters by indicating where alphabetic, numeric and/or special symbols may be expected. The context programming is quite useful for the OCR engine 180 of FIG. 1 to reduce potential confusion when reading similar characters such as, for example, 'O' and '0', 'B' and '8', '1' and 'I', 'S' and '5' etc. In this step, potential text fonts and ranges of text lines can be set within a selected field.

Figure 6:
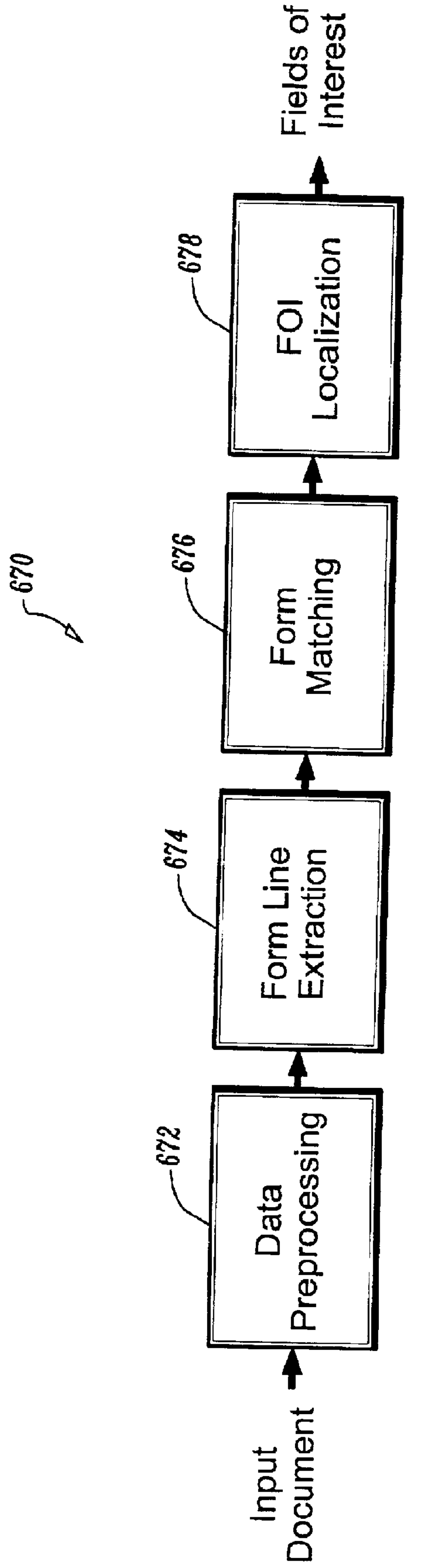
FIG. 6 shows a flow diagram for a portion of the method of FIG. 2.

Turning now to FIG. 6, a form localization process 670 obtains the locations of FOIs. The algorithm 670 is based on a model-matching approach, which includes the four sub-portions of data preprocessing 672, form line extraction 674, form matching 676 and FOI localization 678. In the first step 672, an input document 252 of FIG. 2 is preprocessed by data reduction and skew detection. For the sake of computation, data reduction may comprise resizing the image. A resizing factor is determined based on the width of form lines, and the form template is scaled in correspondence with this factor. A method for skew detection is based on horizontal frame line projection. The angle is estimated by looking at the peak of the projection energy, as known in the art. Given a skew angle, the document can be properly corrected to compensate for skew using standard techniques.

Form line extraction is indicated by reference numeral 674. A created form template may contain vast information, but not all of the information in the template is used for form matching of each drawing image. In practice, only long horizontal and vertical lines are chosen as matching features in this exemplary embodiment. Such lines exhibit robustness against noise and distortion, and can be reliably extracted from both template form and input form. The method for extracting horizontal and vertical lines from an input document is as described for a template document. Due to relatively varied scan quality, some long lines may be broken. A distance threshold can be used to link the gap between two neighboring long runs. The lines that make a closed rectangular border may be assumed for all input documents. If any side of the borderline is missing, a virtual line may be added. Each detected line is parameterized with a rectangular block that details the line length, width and position.

In form matching 676, an iterative line matching procedure is used to estimate the form offset and scaling. Given two sets of lines, a cost function is defined based on city-block or horizontal and vertical distance, which allows a least squares technique to iteratively reduce the average distance between lines in the two sets. The optimal solution is obtained at the function minima. If the minima cost meets a predefined threshold, the estimated pose is used to align the input document with the corresponding template.

The above approach provides a global pose alignment. Due to a nonlinear distortion, FOIs specified locally in the form template may not align well with the input form. In FOI localization 678, one tasks is to refine the FOI pose. This can be performed based on registration of critical points from two closest rectangular boxes in the local region. The pose refinement may be estimated through the least squares technique. Given the registered result and the template field style, the preprinted region of a FOI in the input form is masked out, and only the filled-in data region is used for the subsequent OCR processing 280 of FIG. 2. Another task for FOI localization is to detect FOIs randomly located in the graphic area. Since this type of FOI may have no template specified, a generic rectangular box detection algorithm is developed to perform the task. The algorithm uses corner detection in which a set of corner templates is used to find corner candidates. Based on corner positions, horizontal and vertical lines are then checked to see whether a rectangular box can be constructed within a specified size range. Multiple FOIs with variant sizes are found with this method. The OCR element 180 in the system 100 of FIG. 1 will process all regions of this type of FOI where no preprinted regions are available. FOI localization differs from a form dropout process in that this process is limited instead to the specific area indicated.

Figure 7:
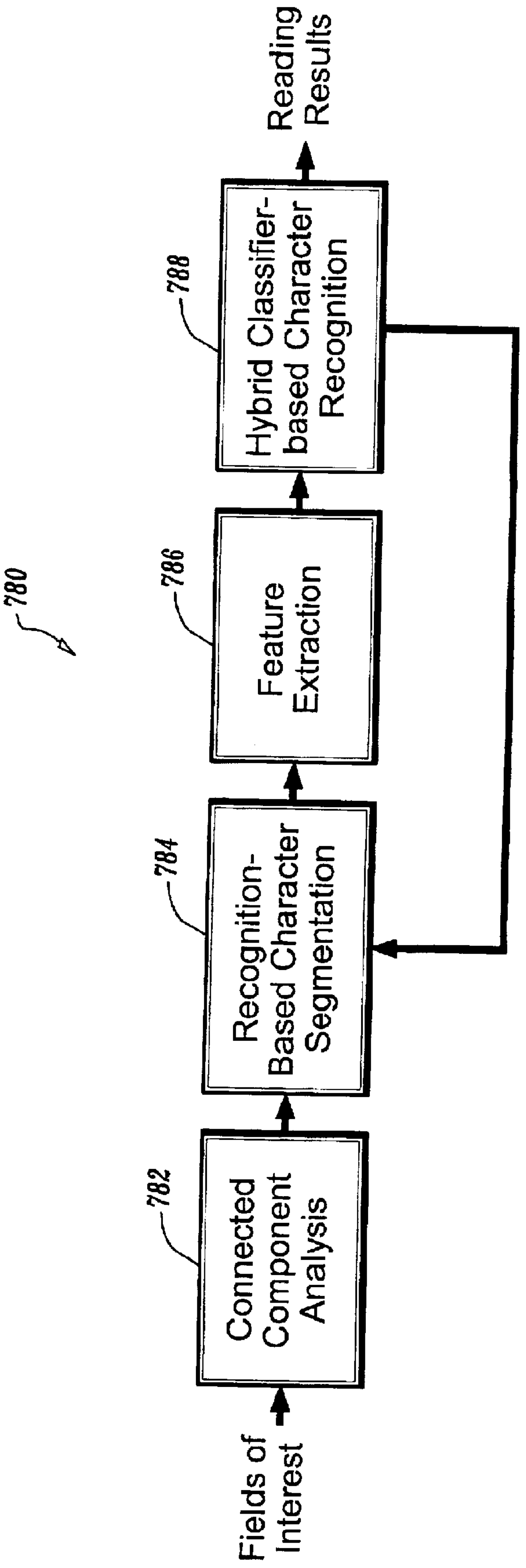
FIG. 7 shows a flow diagram for a portion of the method of FIG. 2.

As shown in FIG. 7, an OCR process 780 translates image bitmaps into character codes. Here, speed, accuracy and adaptive learning capabilities are emphasized to meet performance criteria. Four process steps include connected component analysis 782, recognition-based character segmentation 784, feature extraction 786, and hybrid-classifier-based character recognition 788 are combined for the OCR process 780.

Given a field of interest, connected component analysis 782 segments character-like objects for OCR. The run-length encoding technique is used to label and represent connected components for characters. Since lines including vertical and horizontal are possible within an input region, a block adjacency graph ("BAG") technique as known in the art is integrated to remove lines and reconstruct character strokes where they may be touching or overlapping with lines. To avoid redundancy using the BAG method for representing components with noise and/or dotted patterns, only components connected to horizontal and vertical lines are built. After character-like components are available, neighboring connected components are further merged based on geometrical constrains so that an isolated likely character is segmented.

To separate touching characters, a recognition-based segmentation method 784 is used. In this process, character segmentation is performed depending on the feedback of character recognition. A component is recognized as suspicious when touching other characters because its confidence measure is low and its dimension is abnormal. A discrimination function is defined based on contour projection that can be applied for identifying possible split points for such a component. However, it is possible that a split point may cause a component to be broken. A decision tree is constructed for merging characters caused by an incorrect splitting process. The tree is built with nodes containing possible grouping components from neighborhoods. When a node is recognized with a significant confidence measure, the subsequent node combining adjacent components is preceded. Nodes that give a poor confidence measure are not further evaluated. In practice, the evaluation of neighborhoods is limited upon three contiguous regions in this exemplary embodiment. The tree is constructed until no regions remain. Thus, the most likely path through the tree nodes selects the correct segmentation. As a result, the corresponding character recognition is immediately available as well. The feasibility of this character segmentation method has demonstrated and detailed in the art.

After character segmentation, a set of feature vectors is extracted from a component. The feature extraction portion 786 is based on the processes of hole marking and size normalization. The hole marking uses a topology analysis that detects the set of background pixels in the hole of a character. The detected holes are marked with a gray value other than those used for background and object pixels. Due to this marking, the discrimination power of character features is enhanced. In this embodiment, the size normalization is defined by sampling a character size to 20 pixels in height by 16 pixels in width, which provides feature vectors invariant to character size. However, for those very narrow characters like 'I' or '1', or very wide symbols like '—', their aspect ratios (width-to-height) are extreme. Thus, the background pixels for extreme characters are padded in one dimension to increase and/or decrease the aspect ratio beforehand. In addition, the stroke width in a character component can be computed to give a dedicated feature for the template-matching classifier. This width may be estimated by searching the mode of a histogram computed by horizontal and vertical scans of the object pixels. Thus, a total of 20×16 pixels together with the line width are obtained as feature vectors of a character.

A hybrid classifier-based character recognition process 788 combines neural network and template matching techniques to perform character recognition. In the neural network classifier, a three-layered perceptron is constructed and training is performed by error back-propagation. The number of hidden neurons is varied in covered embodiments due to the training and validation process. Here, 120 hidden neurons are used that are optimally generated for the system. The neural network is trained based on thousands of characters including negative samples and virtual samples. Although the process of training is a cumbersome step, accurate and efficient recognition results are fully dependent on it.

In comparison, the template-matching classifier is much easier to train because it is a non-parametric classifier that makes no assumption about the underlying pattern distributions. Thus, the template-matching classifier is suitable for incrementally learning new fonts and symbols. The system can learn and store symbol images as templates from any given document. However, a drawback of template matching is that it involves an exhaustive search in a database containing a variety of template images, which may lead to inefficiency of speed for the system.

To hybridize these two complementary classifiers, the template-matching classifier is applied only when the neural network classifier gives a low confidence measure. Under this condition, the exemplary template-matching classifier searches the top three candidate classes selected from the neural network classifier. If the difference between the confidence measures of the top two candidates given by the template-matching classifier is less than a threshold, it then searches the rest of database to see whether a better confidence measure can be obtained. The template-matching classifier makes a decision as long as the difference for the top two confidence measures is beyond the threshold. If both classifiers are not sure about their decisions, the output is then determined by a weighted sum of their respective results. Thus, the hybrid classifier sacrifices a minimal computational time, but maintains the system performance and provides learning flexibility.

The OCR verification process 290 of FIG. 2 may achieve substantially complete reading accuracy. In this embodiment, a spreadsheet-based editor is designed to facilitate user intervention, when desired, for rapid verification and modification of reading results. The process of verification is performed on a text string basis, which permits the user to visually compare a selected text string with its image segment. In practice, only a small percentage of reading results are reviewed for verification. Three criteria are defined to select verification candidates in this embodiment. One is based on confidence measure whereby a text string can be selected if the lowest confidence measure among characters is below a specified setting. Another is based on ambiguous character recognition, which means that a text string can be selected if it contains characters such as O/0, B/8, I/1, S/5, etc. Ambiguous characters may lead to errors that cannot normally be filtered out by confidence measures alone.

Another criterion is context format based on prior knowledge of a text string, as provided in the step for form learning. The parameters for context format verification include string length, character case, and context relationship (e.g., the positions of alphabetic, numeric and special symbols). A text string can be selected for verification if the reading results conflict with a given context format. These criteria may be chosen or modified according to actual needs, and a selected text string may come from more than one criteria. Among these criteria, context format may be particularly useful where it can be used to verify text strings for large quantities of data.

Figure 8:
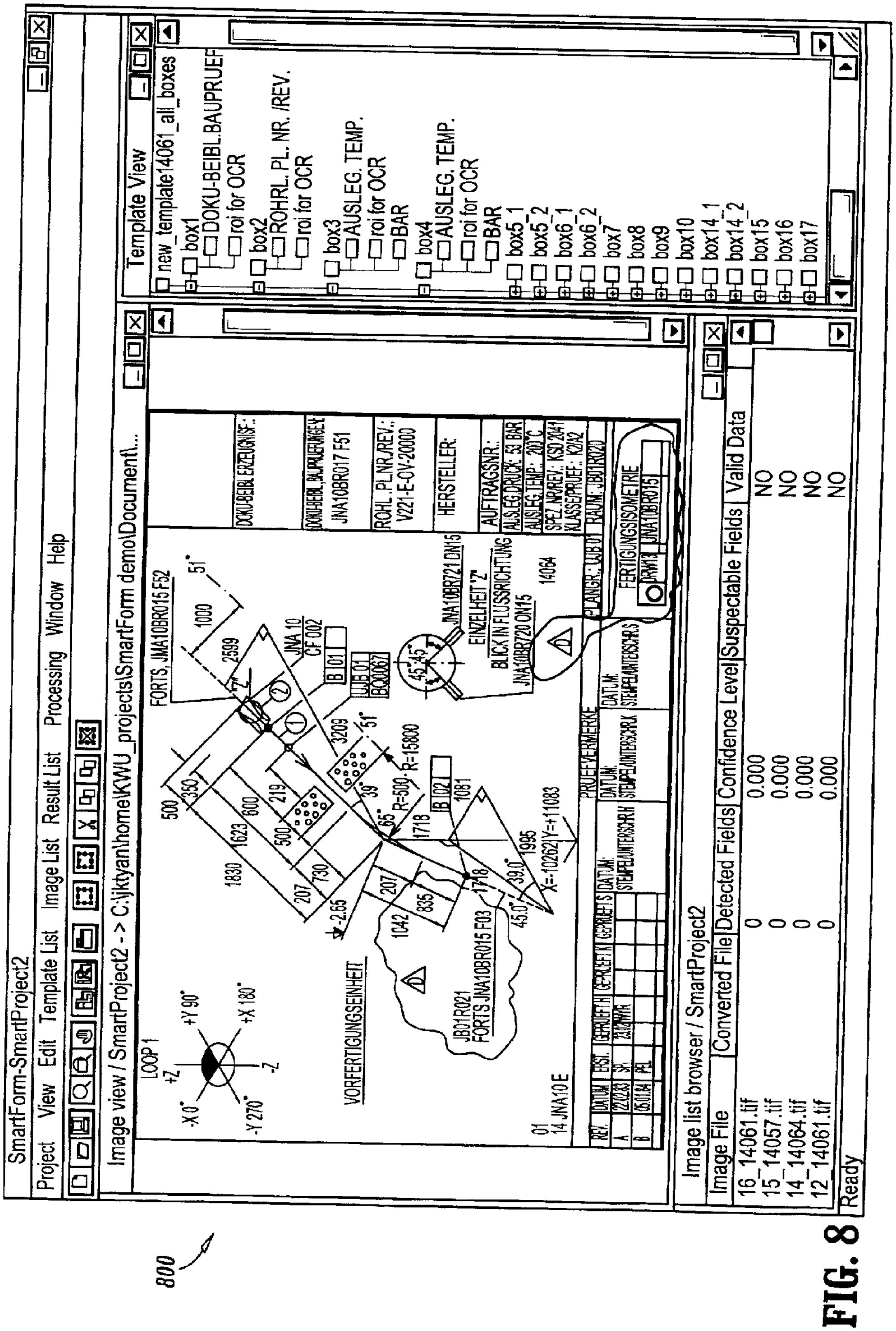
FIG. 8 shows an exemplary display screen in accordance with the method portion of FIG. 3.
Figure 9:
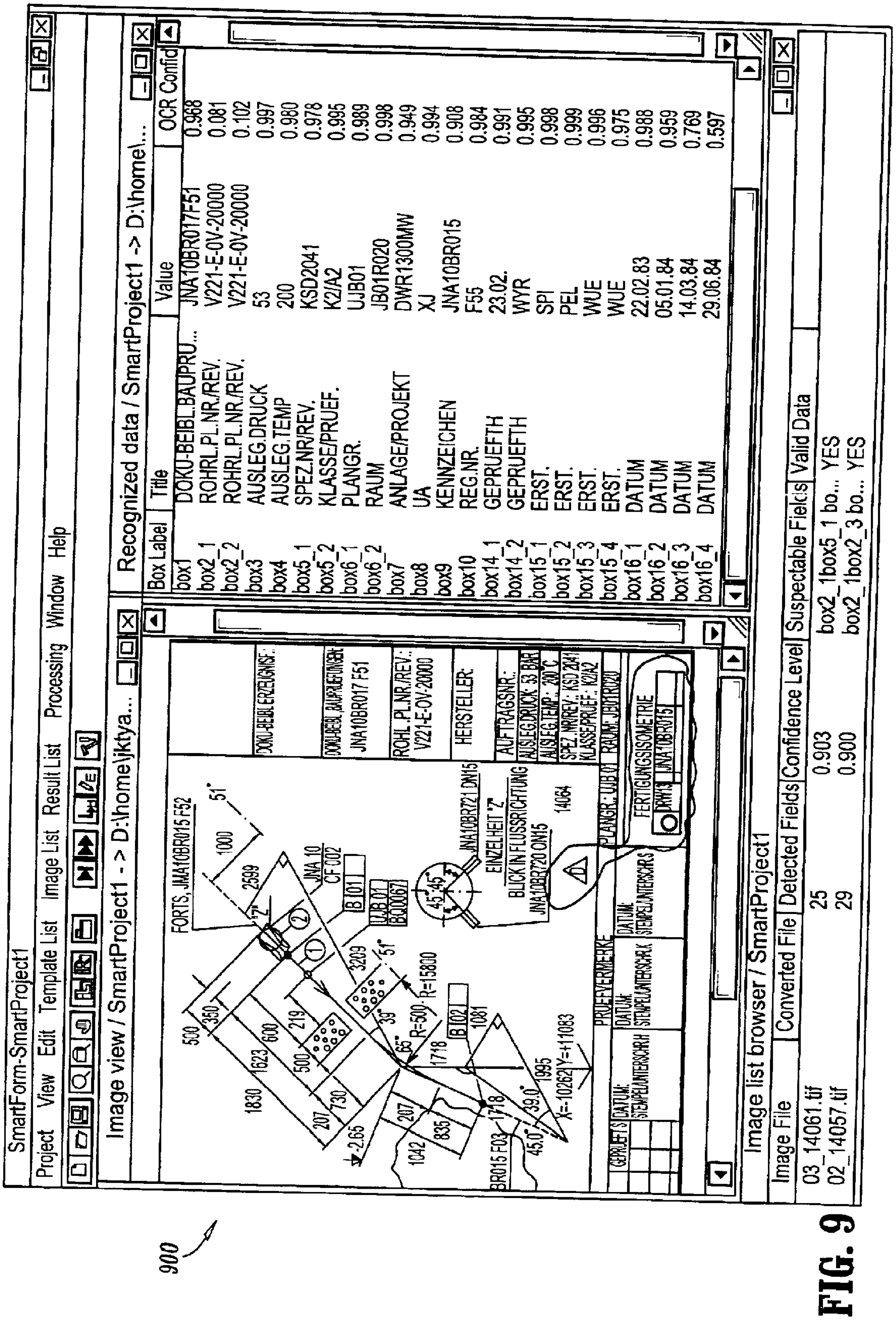
FIG. 9 shows an exemplary display screen in accordance with the method portion of FIG. 7.
Figure 10:
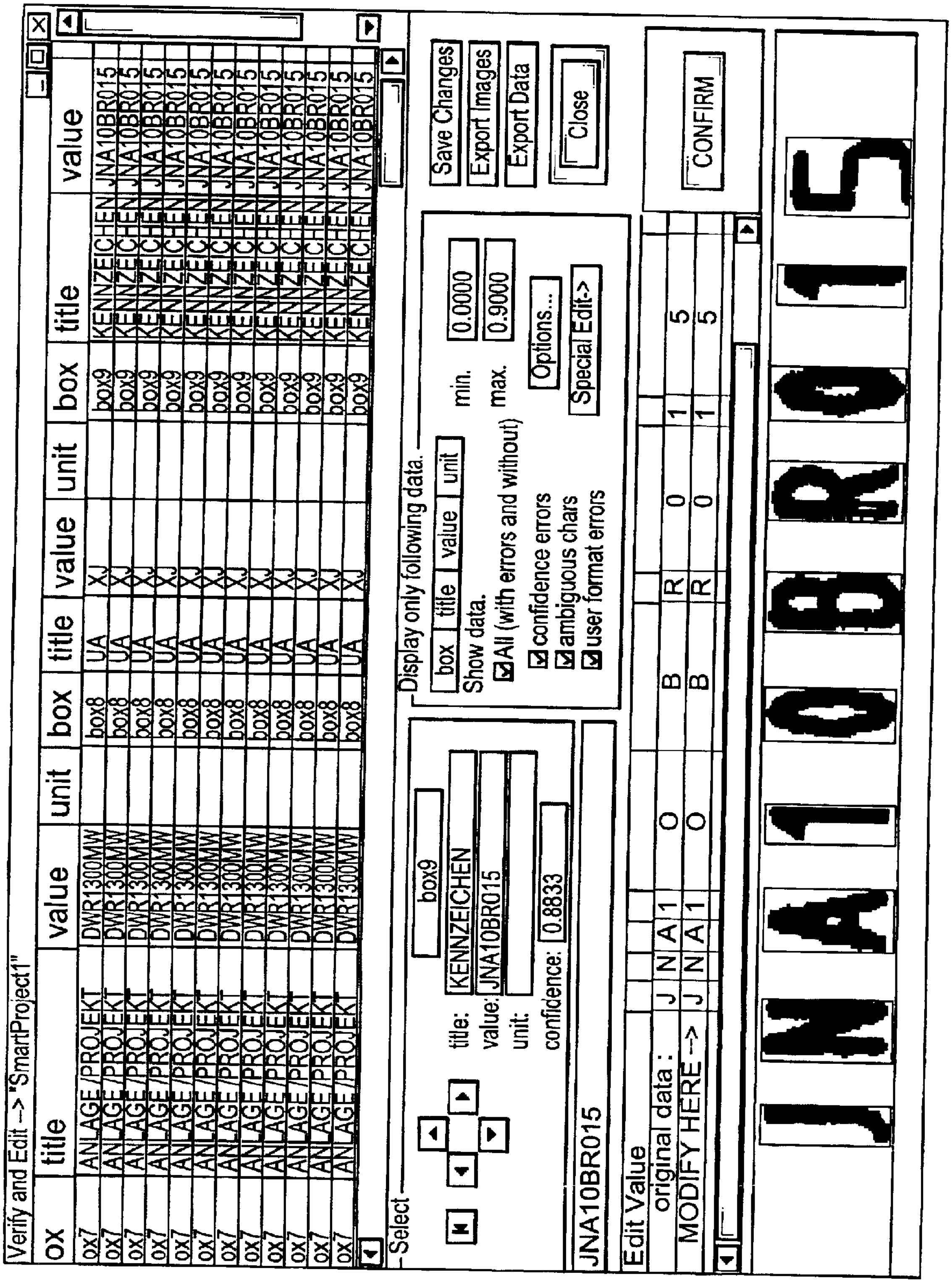
FIG. 10 shows an exemplary display screen in accordance with a portion of the method of FIG. 2.

An embodiment of the automatic document reading system described in the present disclosure has been implemented in a software package called SmartForm™. FIGS. 8, 9, and 10 show exemplary interface screens of the SmartForm™ software for a sample image. The interface screen 800 of FIG. 8 is for form learning 260 of FIG. 2. The interface screen 900 of FIG. 9 is for displaying results of character recognition 280 of FIG. 2. And the interface screen 1000 of FIG. 10 is for verification 290 of FIG. 2. Experiments were conducted on technical drawings of isometric structure in this exemplary embodiment. The test data set was based on a thousand synthesized images created from a set of fully recognized documents varying in pose, signal-to-noise level, and line/stroke width. A form template was selected for testing that may cover up to fifteen fields with 200 characters on average. To evaluate the net program speed and accuracy, no operator intervention was performed.

Table 1 presents a summary of the system performance results for this experiment. According to the given data set, an overall recognition rate of 86.8% on a field basis has been obtained where form localization and character recognition have 5.4% and 7.2% errors, respectively. The average processing time was about 2.6 seconds for completion of the reading of all specified fields, as measured on an Intel Pentium® III 600 Mhz based PC using the Microsoft Windows® NT operating system. The actual time per image varied from 1.7 to 3.5 sec depending roughly on image quality and the quantity of characters therein. The form localization 270 accounted for about forty percent of the execution time while the OCR took up the remaining sixty percent of the execution time.

TABLE 1

Recognition performance and execution time.

| | Recognition Rate (%) (on a field basis) | Execution Time (seconds) per document |
|---|---|---|
| Form localization | 94.6 | 1.09 |
| Character recognition | 92.8 | 1.48 |
| Overall | 86.8 | 2.57 |

Based on a learned form template, embodiments of the present disclosure are able to automatically identify drawing layout, localize fields of interest, and segment and recognize characters. The criteria for detecting potential errors allow the operator to verify reading results very efficiently. The system is also able to learn new fonts and characters from template examples, which ability enables the system to adapt to reading a wide variety of technical drawings. The exemplary embodiment system has been tested on the processing of isometric drawings with positive results. As compared to data translation and entry by a human operator, the disclosed system provides productivity improvements particularly suitable for building electronic archival databases from paper-based technical drawings.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. Such changes and modifications are included within the scope and spirit of the present disclosure as set forth in the appended claims.

What is claimed is:

1. A method for electronic archival of paper-based technical drawings, the method comprising:

providing a model drawing image;

learning the form of the provided model drawing image;

wherein learning the form further comprises:

extracting form lines from the model drawing image, selecting fields of interest relative to the form lines and programming contexts for the fields of interest into a form template;

receiving an input drawing image;

localizing the form of the input drawing image;

wherein localizing the form further comprises: preprocessing data of the input drawing image, extracting form lines of the input drawing image, matching the extracted form lines to those of the learned model drawing image and localizing fields of interest relative to the extracted form lines;

optically recognizing identification text of the input drawing image;

verifying the results of the recognized identification text of the input drawing image; and storing the input drawing image and the corresponding verified identification text into a drawing database.

2. A method as defined in claim 1 wherein extracting form lines is based on a connected-components analysis algorithm, the algorithm comprising:

finding lines;

labelling long connected lines with run-length encoding; and forming a box from a group of labelled lines.

3. A method as defined in claim 1 wherein selecting fields of interest comprises:

receiving a user selection for a field of interest;

determining whether the selected field of interest is regularly located in the form area or randomly located in the graphic area; and analyzing the field of interest in accordance with a set of pre-defined field styles.

4. A method as defined in claim 1 wherein programming contexts comprises:

defining the length of a text string and the positions of its characters by indicating where at least one of alphabetic, numeric and special symbols may be expected; and verifying confusingly similar characters in accordance with potential text fonts and ranges of text lines within a selected field.

5. A method as defined in claim 1 wherein a context relates filled-in text to preprinted text.

6. A method as defined in claim 1 wherein a context relates to a text formatting style.

7. A method as defined in claim 1 wherein preprocessing comprises:

reducing data by resizing the image; and detecting skew by horizontal frame line projection.

8. A method as defined in claim 1 wherein extracting form lines comprises:

choosing long horizontal and vertical lines for matching;

extracting matched lines from both the template form and the input form;

linking broken lines in accordance with a distance threshold;

adding a virtual line if any side of a borderline is missing; and parameterizing each line with a box that details the line length, width and position.

9. A method as defined in claim 1 wherein matching the extracted form lines comprises:

iteratively matching lines to estimate the form offset and scaling;

defining a cost function based on distance;

iteratively reducing the average distance between lines in the two sets in accordance with a least squares function;

locating the optimal solution at the function minima; and using the estimated pose to align the input document with the corresponding template if the minima cost meets a predefined threshold.

10. A method as defined in claim 1 wherein localizing fields of interest comprises:

refining the pose of a field of interest; and masking out a preprinted region of a field of interest to leave a filled-in data region for subsequent processing.

11. A method as defined in claim 10, further comprising detecting a field of interest randomly located in a graphic area.

12. A method as defined in claim 1 wherein optically recognizing identification text comprises:

analyzing connected components of a field of interest;

recognition-based character segmentation of the connected components;

extracting features from the field of interest; and hybrid classifier-based character recognition of the features.

13. A method as defined in claim 12 wherein analyzing connected components comprises:

run-length encoding to label and represent connected components;

removing lines and reconstructing character strokes where they may be touching or overlapping with lines;

building components connected to horizontal and vertical lines;

merging neighboring connected components in accordance with geometrical constrains to isolate a segmented character.

14. A method as defined in claim 12 wherein segmentation comprises:

performing character segmentation in accordance with the feedback of character recognition;

recognizing as suspicious a character that touches another character;

defining a discrimination function based on contour projection;

applying the discrimination function to identify split points for the suspicious character.

15. A method as defined in claim 14, further comprising:

constructing a decision tree for merging characters caused by an incorrect splitting process;

recognizing a node of the tree having a significant confidence measure;

selecting the correct segmentation in accordance with the most likely path through the nodes of the tree; and immediately providing the corresponding character recognition.

16. A method as defined in claim 12 wherein extracting features comprises:

extracting a set of feature vectors from a component;

marking holes with a gray value other than those used for background and object pixels in accordance with a topology analysis that detects the set of background pixels in a hole of a character;

normalizing the size of a character by sampling the character size to a given pixel height and width to provide feature vectors invariant to character size;

padding the background pixels for extreme characters in one dimension to adjust the aspect ratio for the extreme character;

computing a stroke width in a character component to give a dedicated feature for template-matching.

17. A method as defined in claim 12 wherein the hybrid classifier-based character recognition comprises:

neural network classification using a three-layered perceptron and error back-propagation;

hybridizing the neural network classification with a template-matching classification by applying the template-matching classifier only when the neural network classifier gives a low confidence measure; and determining an output by a weighted sum of their respective results if neither classifier individually produces a result having a sufficient confidence measure.

18. A program storage device readable by machine, tangibly embodying a program of instructions executable by the machine to perform method steps for electronic archival of paper-based technical drawings, the method steps comprising:

providing a model drawing image;

learning the form of the provided model drawing image;

wherein the method step of learning the form further comprises steps for: extracting form lines from the model drawing image, selecting fields of interest relative to the form lines and programming contexts for the fields of interest into a form template;

receiving an input drawing image;

localizing the form of the input drawing image;

wherein the method step of localizing the form further comprises steps for: preprocessing data of the input drawing image, extracting form lines of the input drawing image, matching the extracted form lines to those of the learned model drawing image and localizing fields of interest relative to the extracted form lines;

optically recognizing identification text of the input drawing image;

verifying the results of the recognized identification text of the input drawing image; and storing the input drawing image and the corresponding verified identification text into a drawing database.

19. A program storage device as defined in claim 18 wherein the method step of optically recognizing identification text comprises steps for:

analyzing connected components of a field of interest;

recognition-based character segmentation of the connected components;

extracting features from the field of interest; and hybrid classifier-based character recognition of the features.

20. A system for electronic archival of paper-based technical drawings, the system comprising:

providing means for providing a model drawing image;

learning means for learning the form of the provided model drawing image;

wherein the learning means for learning the form further comprises: extracting means for extracting form lines from the model drawing image, selecting means for selecting fields of interest relative to the form lines and programming means for programming contexts for the fields of interest into a form template;

receiving means for receiving an input drawing image;

localizing means for localizing the form of the input drawing image;

wherein the localizing means for localizing the form further comprises: preprocessing means for preprocessing data of the input drawing image, extracting means for extracting form lines of the input drawing image, matching means for matching the extracted form lines to those of the learned model drawing image and localizing means for localizing fields of interest relative to the extracted form lines;

recognizing means for optically recognizing identification text of the input drawing image;

verifying means for verifying the results of the recognized identification text of the input drawing image; and storing means for storing the input drawing image and the corresponding verified identification text into a drawing database.

21. A system as defined in claim 20, further comprising:

analyzing means for analyzing connected components of a field of interest;

segmentating means for recognition-based character segmentation of the connected components;

extracting means for extracting features from the field of interest; and recognizing means for hybrid classifier-based character recognition of the features.

22. A system (100) for electronic archival of paper-based technical drawings, the system comprising:

a processor (102);

a form learning unit (160) in signal communication with the processor for learning the form of a model drawing image;

wherein the form learning unit (160) for learning the form further comprises: form line extraction unit (362) for extracting form lines from the model drawing image, fields of interest selection unit (364) for selecting fields of interest relative to the form lines and context programming unit (366) for programming contexts for the fields of interest into a form template;

a form localization unit (170) in signal communication with the processor for localizing the form of an input drawing image;

wherein the form localization unit (170) further comprises: data processing unit (672) for preprocessing data of the input drawing image, form line extraction unit (674) for extracting form lines of the input drawing image, form matching unit (676) for matching the extracted form lines to those of the learned model drawing image and fields of interest localization unit (678) for localizing fields of interest relative to the extracted form lines;

an optical character recognition unit (180) in signal communication with the processor for optically recognizing identification text of the input drawing image; and a result verification unit (190) in signal communication with the processor for verifying the results of the recognized identification text of the input drawing image.

* * * * *